US010320665B2

(12) United States Patent
Goliya et al.

(10) Patent No.: US 10,320,665 B2
(45) Date of Patent: Jun. 11, 2019

(54) CONFIGURATION OF A LOGICAL ROUTER FOR DYNAMIC ROUTING

(71) Applicant: NICIRA, INC., Palo Alto, CA (US)

(72) Inventors: Abhishek Goliya, Pune (IN); Uday Masurekar, Palo Alto, CA (US); Minjal Agarwal, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/642,343

(22) Filed: Jul. 6, 2017

(65) Prior Publication Data

US 2018/0234337 A1 Aug. 16, 2018

(30) Foreign Application Priority Data

Feb. 16, 2017 (IN) .............................. 201741005552

(51) Int. Cl.
*H04L 12/775* (2013.01)
*H04L 29/08* (2006.01)

(52) U.S. Cl.
CPC .............. *H04L 45/58* (2013.01); *H04L 67/02* (2013.01)

(58) Field of Classification Search
CPC .................................. H04L 45/58; H04L 67/02
See application file for complete search history.

(56) References Cited

U.S. PATENT DOCUMENTS

| 8,160,076 B1 * | 4/2012 | Aggarwal | H04L 12/18 370/390 |
| 2015/0263899 A1 * | 9/2015 | Tubaltsev | H04L 45/02 370/254 |
| 2015/0263946 A1 * | 9/2015 | Tubaltsev | H04L 45/586 370/392 |
| 2016/0191371 A1 * | 6/2016 | Dujodwala | H04L 12/4675 370/254 |

* cited by examiner

*Primary Examiner* — Afshawn M Towfighi
(74) *Attorney, Agent, or Firm* — Adeli LLP

(57) ABSTRACT

Some embodiments provide a method for configuring a logical router to exchange routing data with a neighboring router through a dynamic routing protocol. The logical router is implemented as multiple routing components. The method receives identification data for the neighboring router with which to peer the logical router. Based on the identification data, the method identifies a subset of the routing components to peer with the neighboring router. The method generates configuration data for each routing component in the identified subset. Each identified routing component uses the configuration data to exchange routing data with the neighboring router through the dynamic routing protocol.

23 Claims, 10 Drawing Sheets

CONFIGURATION OF A LOGICAL ROUTER FOR DYNAMIC ROUTING

RELATED APPLICATION

Benefit is claimed under 35 U.S.C. 119(a)-(d) to Foreign Application Serial No. 201741005552 filed in India entitled "CONFIGURATION OF A LOGICAL ROUTER FOR DYNAMIC ROUTING", filed on Feb. 16, 2017, by Nicira, Inc., which is herein incorporated in its entirety by reference for all purposes.

BACKGROUND

In a standard physical network, dynamic routing protocols allow routers to dynamically learn information about remote networks and automatically add this information to their own routing tables. The network routers dynamically exchange routing data between each other through one or more routing protocols whenever there is a change in the network topology. This exchange allows routers to automatically learn about new networks and also to find alternate paths if there is a link failure to a current network.

In virtual networking, a logical router of a logical network can have several different routing components through which the logical network exchanges traffic (e.g., north-south traffic) with other networks. These routing components may be implemented on different edge nodes that connect the logical network to other external networks. An intelligent method for enabling these routing components to exchange information with routers of the external network is needed.

BRIEF SUMMARY

Some embodiments provide a method for configuring a logical router of a logical network to peer with one or more neighboring routers (e.g., physical routers) through one or more dynamic routing protocols such as Border Gateway Protocol (BGP). The logical router uses a dynamic routing protocol in order to dynamically exchange routing data with the neighboring routers. For instance, when a change occurs in the network topology, the logical router and its neighboring routers exchange updated routing information through a set of dynamic routing protocol sessions (e.g., a BGP session) that is established between the logical router and the other routers. The logical router may also use other protocols to peer with the external neighboring routers, such as Bidirectional Forwarding Detection (BFD) to maintain connectivity.

Upon receiving a definition of a logical router for a logical network, a network management and control system of some embodiments defines several routing components for the logical router. In some embodiments, when the logical router connects to an external network (e.g., an external physical and/or logical network), the management and control system of the network defines one distributed routing component for the logical router as well as one or more centralized routing components (e.g., one centralized routing component to implement each interface of the logical router that connects to the external network, also referred to as an uplink). Each of these centralized routing components is then assigned to, and implemented by, a host machine (e.g., a gateway machine at the edge of the network) in order to implement the corresponding logical router interface.

Some embodiments generate and selectively distribute peering configuration data specific to each centralized routing component when the logical router and neighboring routers for the logical network are defined (e.g., by a network administrator), or when these configurations change. That is, after a user provides a configuration for (i) a logical router that connects to the external network and (ii) one or more neighboring routers with which the logical router should peer, the management and control system identifies which centralized routing components of the logical router should peer with each neighboring router, based on the configuration of the neighboring router and the uplinks implemented by the centralized routing components. The management and control system generates the peering configuration data for the different centralized routing components, and delivers to each host machine that operates a centralized routing component the particular peering configuration data required for that routing component to peer with its neighboring router or routers.

The peering configuration data that is generated and distributed by the management and control system, however, is not limited to dynamic routing protocols' configuration data. For example, upon receiving a definition of a Bidirectional Forwarding Detection connection between a particular uplink of a logical router and a neighboring router, the management and control system of some embodiments generates and distributes the necessary BFD configuration data for the particular uplink only to the routing component that is associated with that uplink.

The neighboring routers with which the logical router peers may not be a single-hop neighbor (i.e., on the same external subnet as the uplink interface of the logical router). For example, some embodiments allow a user to define a BGP multi-hop neighbor for a logical router. A BGP (or other protocol) multi-hop neighbor for a logical router is a BGP peer that is more than one hop away from an uplink port of the logical router (i.e., there are one or more external routers between the BGP neighbor and the uplink port of the logical router). Upon receiving the definitions of the logical router and its multi-hop neighbor, some embodiments automatically generate the necessary multi-hop neighbor configuration for the logical router and deliver the generated configuration to the edge node(s) that implement the corresponding routing components of the logical router, as with a single-hop neighbor.

In some embodiments, for multi-hop neighbors, the management and control system generates the multi-hop neighbor configuration data and delivers the generated data to one or more controllers that manage the centralized routing components of the logical router or their edge host machines. These controllers may be local control applications that operate on the host machines (e.g., in the virtualization software of the host machines) or external controllers that manage multiple host machines in different embodiments. In some embodiments, the controllers monitor the routing data (e.g., routing tables) of their corresponding routing components in order to determine the reachability of the multi-hop neighbor.

The routing data may be received from different sources in some embodiments. For example, an administrator might configure for the logical router a static route for the subnet to which the multi-hop neighbor belongs, that forwards all the traffic to that subnet through a specific uplink. In this case, the routing table for the routing component implementing that specific uplink (and the routing tables of other components) will be updated with the static route, such that the traffic for the subnet is all sent to that routing component.

In addition, the controller managing the specific routing component will configure the routing component to peer with the multi-hop neighbor.

In addition, the centralized routing components may already have other routing protocol peers, with which they exchange routing information (e.g., other single hop peers), and can receive routes to the multi-hop neighbor from these peers. These routes are added to the routing table (e.g., by the controller that manages the component), and the controller monitors these routing tables for a route to the multi-hop neighbor. In some embodiments, only when a controller determines that a multi-hop neighbor (e.g., a BGP neighbor) is reachable through its corresponding routing component does the controller configure the corresponding routing component to peer with the multi-hop neighbor.

Even though the above-described method dynamically configures the centralized routing components (e.g., based on their neighboring routers' information), in some embodiments an administrator can override such a dynamic configuration. For example, in some embodiments, the administrator has the option to explicitly specify which uplink ports of a logical router should be configured to peer with a particular neighbor for a particular protocol. That is, the user can directly provide (e.g., as part of a BGP neighbor's definition) which uplink port(s) of the logical router should be peered with a particular BGP neighbor.

Upon receiving an overriding specification from a user, some embodiments deliver the BGP neighbor configuration only to the centralized routing component(s) that implements the specified uplink port(s). For example, even though a BGP neighbor might be reachable through several routing components of a logical router, when a user specifies a particular uplink port among the several ports, the routing component associated with the particular uplink port receives the BGP configuration data only.

The above-described selective distribution of neighbor configuration data to routing components is not limited to initial configuration of a logical router (i.e., when the user defines the logical router). Some embodiments reconfigure some or all of the routing components of a logical router with dynamic routing protocol configuration data when there is a change in uplink configuration of the logical router. As an example, based on an initial definition of a logical router, the management and control system may decide to deliver the BGP neighbor configuration of a logical router to a first centralized routing component of the logical router.

If a user later adds another uplink to the logical router (hence another centralized routing component to be implemented for the logical router) which peers with the same (or different) BGP neighbor, the management and control system delivers the same (or different) BGP configuration data to the newly implemented centralized routing component. In other words, each time the uplink ports of a logical router are modified (e.g., an uplink port is added, an uplink port is deleted, etc.), the management and control system determines whether a new generation and delivery of BGP neighbor configuration data is required based on the recent modification.

In some embodiments, when a user queries the state of a BGP neighbor of a logical router (e.g., through a manager of the network), the management and control system retrieves the related data from all of the centralized routing components of the logical router on which the BGP neighbor is configured. The management and control system then aggregates the retrieved data into a unified state/status report for the BGP neighbor and provides this unified report to the requesting user. In some embodiments, if a BGP neighbor is not configured on any of the active centralized routing components, the management and control system reports the BGP neighbor as a disabled BGP neighbor.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1A:
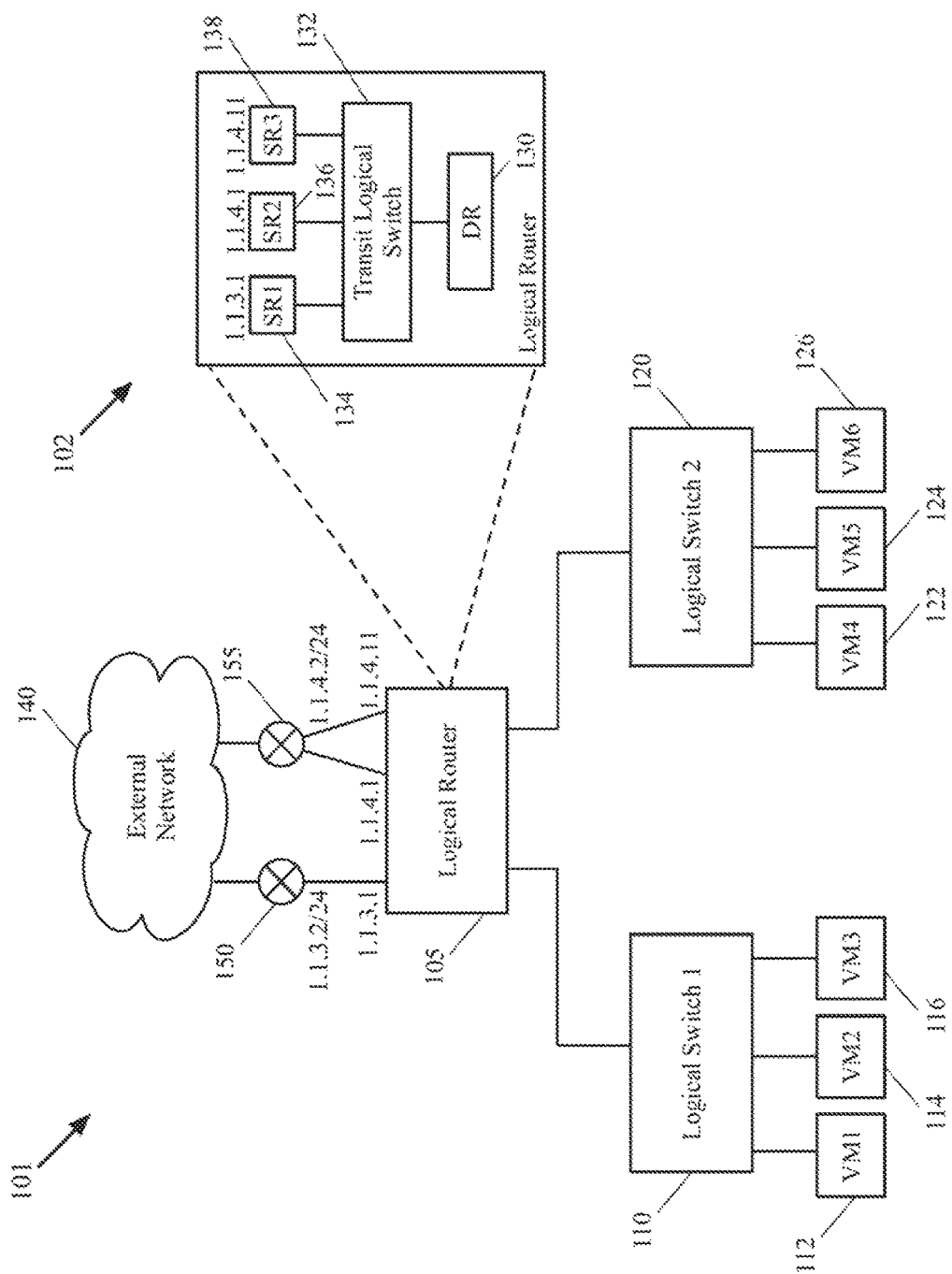
FIGS. 1A-1C illustrate a logical network connected to an external network through a logical router, the physical implementation of the logical network, and a selective distribution of the BGP neighbor configuration data to the different routing components implementing the uplinks of the logical router.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for configuring a logical router of a logical network to peer with one or more neighboring routers (e.g., physical routers) through one or more dynamic routing protocols such as Border Gateway Protocol (BGP). The logical router uses a dynamic routing protocol in order to dynamically exchange routing data with the neighboring routers. For instance, when a change occurs in the network topology, the logical router and its neighboring routers exchange updated routing information through a set of dynamic routing protocol sessions (e.g., a BGP session) that is established between the logical router and the other routers. The logical router may also use other protocols to peer with the external neighboring routers, such as Bidirectional Forwarding Detection (BFD) to maintain connectivity.

Upon receiving a definition of a logical router for a logical network, a network management and control system of some embodiments defines several routing components for the logical router. In some embodiments, when the logical router connects to an external network (e.g., an external physical and/or logical network), the management and control system of the network defines one distributed routing component for the logical router as well as one or more centralized routing components (e.g., one centralized routing component to implement each interface of the logical router that connects to the external network, also referred to as an uplink). Each of these centralized routing components is then assigned to, and implemented by, a host machine (e.g., a gateway machine at the edge of the network) in order to implement the corresponding logical router interface.

Some embodiments generate and selectively distribute peering configuration data specific to each centralized routing component when the logical router and neighboring routers for the logical network are defined (e.g., by a network administrator), or when these configurations change. That is, after a user provides a configuration for (i) a logical router that connects to the external network and (ii) one or more neighboring routers with which the logical router should peer, the management and control system identifies which centralized routing components of the logical router should peer with each neighboring router, based on the configuration of the neighboring router and the uplinks implemented by the centralized routing components. The management and control system generates the peering configuration data for the different centralized routing components, and delivers to each host machine that operates a centralized routing component the particular peering configuration data required for that routing component to peer with its neighboring router or routers.

As described above, the logical router of a logical network connects the logical network to one or more external networks. That is, the north-south network traffic that is generated by, or destined for, the data compute nodes (DCNs) of the logical network passes through this logical router. The DCNs, in some embodiments, are end machines (e.g., a virtual machine, a namespace, a container, a physical machine, etc.) that are logically connected to each other and to other DCNs of other networks (logical and/or physical networks) through the logical router as well other logical forwarding elements (e.g., logical switches, other logical routers, etc.) of the logical network.

The set of logical forwarding elements is implemented by one or more managed forwarding elements that operate (execute) on each host machine in some embodiments. A managed forwarding element operates in a virtualization software (e.g., a hypervisor) of a host machine. The set of logical forwarding elements is also implemented by one or more managed hardware forwarding elements (e.g., a hardware top of rack (TOR) switch) through physical ports of which a set of physical machines (e.g., physical servers) logically connects to the logical network.

In some embodiments, a user defines a logical network topology (i.e., defines the logical network elements and the connections between these elements) for a logical network through a management plane of the logical network. The management plane of a logical network, in some embodiments, includes one or more manager machines (or manager applications) through which the different logical network elements are defined (e.g., through API calls, user interfaces, etc.). The management plane generates configuration data for the defined network elements and pushes the configuration data to the control plane of the logical network (e.g., one or more controller machines or applications). The control plane controls the data exchange between the managed forwarding elements in the logical network.

The management and control system pushes the configuration and forwarding data to a set of physical nodes (e.g., host machines, gateway machines, etc.) in order to configure the physical nodes to implement the logical network (i.e., to implement the logical network elements of the logical network). The configuration and forwarding data that is distributed to the physical nodes, in some embodiments, defines common forwarding behaviors of the managed forwarding elements (MFEs) that operate on the physical nodes in order to implement the logical forwarding elements (LFEs). The configuration data also configures the virtualization software of the host machines to implement other logical network elements (e.g., to instantiate a distributed firewall instance on each hypervisor that implements the logical firewall).

In some embodiments, a local controller that operates on each physical node (e.g., in the hypervisor of a host machine) receives the configuration and forwarding data from the CCP cluster first. The local controller then generates customized configuration and forwarding data that, for example, defines specific forwarding behavior of an MFE that operates on the same host machine on which the local controller operates and distributes the customized data to the MFE. The MFE implements the set of logical forwarding elements based on the configuration and forwarding data received from the local controller. Each MFE can be connected to several different DCNs, different subsets of which may belong to different logical networks (e.g., for different tenants of a datacenter). As such, the MFE is capable of implementing different sets of logical forwarding elements for different logical networks.

Figure 1B:
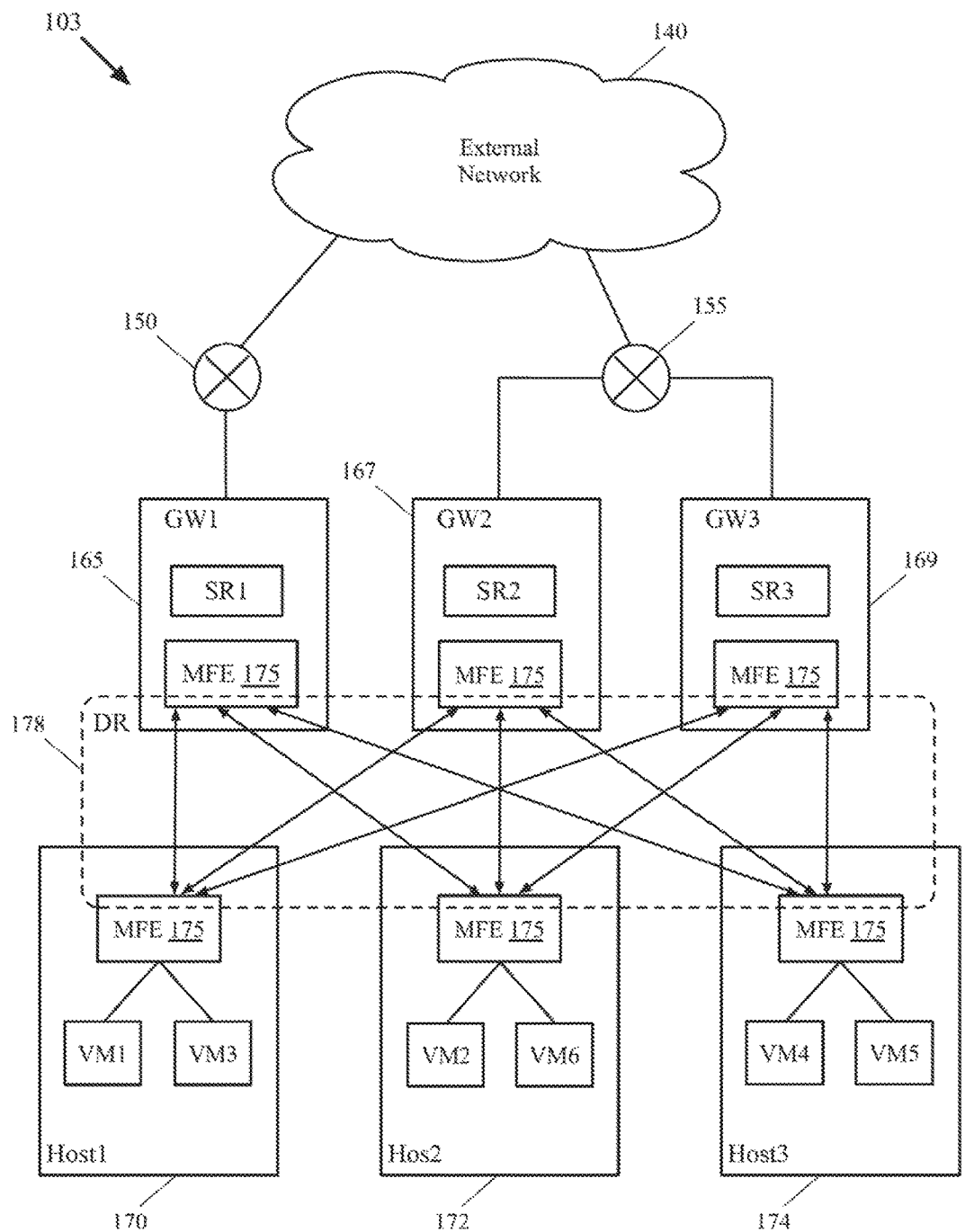
Figure 1C:
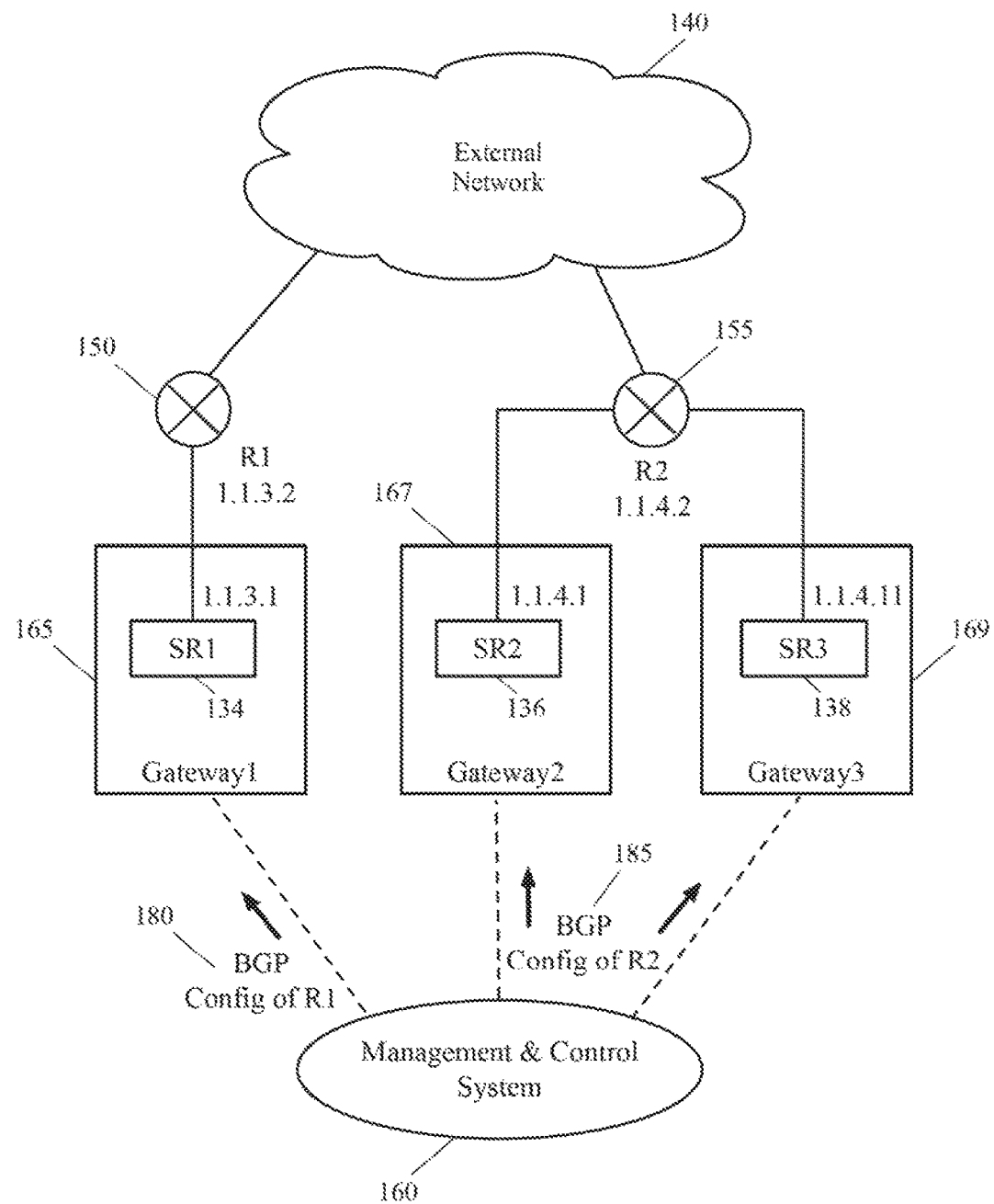

FIGS. 1A-1C illustrate a logical network connected to an external network through a logical router, the physical implementation of the logical network, and a selective distribution of the BGP neighbor configuration data to the different routing components implementing the uplinks of the logical router. More specifically, FIG. 1A illustrates a logical network 101 that includes a logical router 105, two logical switches 110 and 120, two physical routers 150 and 155, and an external network 140. The logical router 105 is coupled with the logical switches 110 and 120 through the router's southbound interfaces, while its northbound interfaces are coupled with the physical routers 150 and 155 in order to connect to the external network 140. This figure also shows a management plane view 102 of the logical router 105.

The logical network 101 can be an overlay network (e.g., defined for a tenant of a datacenter) that is implemented by a physical network infrastructure (e.g., a physical network of a datacenter). For this logical network, the logical router 105 connects the logical switches 110 and 120 to each other and to the external network 140. The logical switch 110 logically connects the virtual machines (VMs) 112-116 to each other and to the logical network 101, while the logical switch 120 logically connects the VMs 122-126 to each other and to the logical network 101.

Through these logical forwarding elements 105-120, the VMs 112-116 and VMs 122-126 communicate with each other and with other end machines in the external network 140. While shown as VMs in this figure, it should be understood that other types of data compute nodes such as namespaces, containers, etc., may connect to logical switches 110 and 120 in some embodiments. In some embodiments, in fact, the user may simply configure these VMs as workloads, allowing the system to determine how to implement the workloads (e.g., as VMs, namespaces, physical machines, etc.).

The logical router 105 shown in the figure includes three northbound ports (also referred to as uplinks or uplink ports) that connect to the external network 140 through the physical routers 150 and 155. Specifically, one of the uplinks is coupled with the router 150, while the other two uplinks are coupled with the same physical router 155. In some embodiments, each pair of physical router and uplink of the logical router can be peered together under a particular dynamic routing protocol in order to exchange routing data with each other. In some embodiments, each pair of peer routers are in a same subnet (i.e., the uplink interface and the southbound interface of its peer physical router share the same subnet internet protocol (IP) address).

It should be understood that the number of logical network elements illustrated in the figure is limited in order to simplify the description. Otherwise, a logical network may have many more logical network elements such as additional logical forwarding elements and/or logical middleboxes (e.g., logical firewalls, logical DHCP servers, logical load balancers, etc.). Conversely, a logical network may include a single logical switch that logically connects several different machines (physical or virtual) to each other (when the logical network is not connected to an external network). Similarly, the number of demonstrated virtual machines is exemplary. A real logical network may connect thousands of virtual and physical machines together and to other networks.

A logical router, in some embodiments, can be viewed from three different perspectives. The first of these views is the API view, or configuration view, which is how the logical router is defined by a user (e.g., a datacenter provider or tenant). The second view is the control plane, or management plane, view, which is how the management and control system internally defines the logical router (after receiving the definition of the logical router). Finally, the third view is the physical realization view, or implementation view of the logical router, which is how the logical router is actually implemented in a hosting system.

In other words, a logical router is an abstraction describing a set of functionalities (e.g., routing, network address translation (NAT), etc.) that a user configures for the logical router. The logical router is then implemented by various physical nodes in the hosting system (e.g., a multi-tenant datacenter) based on instructions distributed to those physical nodes by the management and control system, which generates the instructions according to the configuration provided by a user.

As the illustrated configuration view of the logical router (in logical network 101) shows, a user has defined the logical router to have a first uplink port that has an IP address of 1.1.3.1, a second uplink port that has an IP address of 1.1.4.1, a third uplink port that has an IP address of 1.1.4.11. The user has also defined that these uplink ports should be connected to the external network 140 through a first physical router that has an interface with an IP address of 1.1.3.2, and a second physical router that has an interface with an IP address of 1.1.4.2.

In the management plane view, the logical router of some embodiments may include one distributed routing component (also referred to as a distributed router (DR)) and one or more centralized routing components (each of which is also referred to as a service router (SR)). The DR, in some embodiments, spans managed forwarding elements (MFEs) that couple directly to VMs or other DCNs that are logically connected, directly or indirectly, to the logical router. The DR of some embodiments also spans the gateways (or edge host machines) to which the logical router is bound.

The DR, in some embodiments, is responsible for first-hop distributed routing between logical switches and/or other logical routers that are logically connected to the logical router. In some embodiments, a DR of a logical router handles east-west traffic for a logical network, while the SRs of the logical network handle the north-south traffic of the logical network. The SRs of some embodiments can also be responsible for delivering services that are not implemented in a distributed fashion (e.g., some stateful services such as stateful firewall, source NAT, etc.).

In some embodiments, the physical realization of a logical router always includes a DR (i.e., for first-hop routing). A logical router will have SRs if either (i) the logical router connects to external network(s) or (ii) the logical router has services configured that do not have a distributed implementation (e.g., NAT, load balancing, DHCP in some embodiments), or both. In the illustrated realization view 102, the management and control system has created three service routers 134-138 for the logical router 105, as well as a distributed router 130 and a transit logical switch 132.

The DR 130 includes a southbound interface for each of the logical switches 110 and 120, and a single northbound interface to the transit logical switch 132 (and through this switch to the SRs). Each of the SRs 134-138 includes a single southbound interface to the transit logical switch 132 (which is used to communicate with the DR 130, as well as each other in certain situations). Each of the SRs 134-138 also corresponds to an uplink port of the logical router (that connects to the external network), and thus each of the SRs has a single such interface. Specifically, the SR 134 has a northbound interface corresponding to the uplink with IP address 1.1.3.1., the SR 136 has a northbound interface corresponding to the uplink with IP address 1.1.4.1., the SR 138 has a northbound interface corresponding to the uplink with IP address 1.1.4.11. An SR, in some embodiments, is implemented as a data compute node (e.g., a virtual machine) operating on a corresponding gateway machine, while in other embodiments, an SR is a module that executes on the gateway machine.

The management plane operations to define multiple routing components for a logical router and the detailed configuration of the northbound and southbound interfaces of the various router components and their connections with a transit logical switch are described in detail in U.S.

Provisional Application 62/110,061, filed Jan. 30, 2015; U.S. Patent Publication 2016/0226754; and U.S. patent application Ser. No. 14/871,968, filed Sep. 30, 2015, now issued as U.S. Pat. No. 10,230,629, all of which are incorporated herein by reference.

In some embodiments, the management plane generates separate routing information bases (RIBs) for each of the routing components. That is, in addition to having separate objects created in the management/control plane, each of the routing components 130 and 134-138 is treated as a separate router with a separate routing table. Some embodiments define a subnet for the transit logical switch from a pool of available subnets for internal use, and define the internal interfaces of the routing components 130 and 134-138 as having IP addresses in that subnet. In addition, the management plane assigns MAC addresses to each of the internal interfaces.

The RIB (and thus the FIB, after RIB to FIB conversion) for the DR 130 of some embodiments is defined with a default route pointing to any of the three southbound interfaces of the SRs 134-138 (which the implementation would choose among using equal-cost multi-path (ECMP) principles). In addition, the user would typically configure a static default route for the logical router pointing to the external routers 150 and 155, which would be automatically added to the RIBs (and thus the FIBs, after RIB to FIB conversion) for each of the three SRs 134-138.

FIG. 1B illustrates the physical implementation of the logical network 101 illustrated in FIG. 1A. More specifically, this figure shows how the physical nodes of the physical network architecture 103 are configured to implement the different network elements including the different routing components of the logical router 105. The figure includes three host machines 170-174 and three gateway machines (or edge host machines) 165-169 as the physical nodes of the physical network (e.g., of a hosting system). The gateway machines communicate with the external network 140 through the external physical routers 150 and 155. It should be understood that the number of the host machines, gateways, and DCNs (VMs in this example) illustrated in the figure are exemplary and a logical network for a tenant of a hosting system may span a multitude of host machines (and third-party hardware switches), and logically connect a large number of DCNs to each other (and to several other physical devices that are connected to the hardware switches).

Although the VMs 112-0116 are coupled to the same logical switch 110 and the VMs 122-0126 are coupled to the same logical switch 120, these VMs reside on different host machines 170-174 in the physical implementation. Specifically, the virtual machines 112 and 116 execute on the host machine 170, the virtual machines 114 and 126 execute on the host machine 172, and the virtual machines 122 and 124 execute on the host machine 174. Each of these host machines may execute several other DCNs (e.g., for other logical networks of other tenants). Additionally, each host machine also executes a Managed forwarding element (MFE) 175. Although shown as a single MFE, in some embodiments, a set of MFEs run on each host machine to implement different LFEs of a single logical network or different logical networks.

As stated, the MFEs 175 operate on these host machines in order to implement the distributed aspects of the logical network. The MFEs 175, in some embodiments, are software virtual switches (e.g., Open vSwitch (OVS), ESX) that operate within the hypervisors or other virtualization software on the host machines. Though the MFEs are software virtual switches, they may be referred to as physical forwarding elements in order to differentiate them from the logical forwarding elements 105-120, which are abstract elements defined as a network configuration, and which are implemented on the physical forwarding elements.

The MFEs 175 perform first-hop switching and routing to implement the logical switches 110 and 120, and the logical router 105, for packets sent by the VMs of the logical network 101. The MFEs 175 (or a subset of them) also may implement logical switches (and distributed logical routers) for other logical networks if the other logical networks have VMs that reside on the host machines 170-174 as well.

Each of the three SRs 134-138 operates on a different gateway machine. Specifically, gateway machine 165 executes the SR 134, the SRs 136 and 138 execute on the gateway machines 167 and 169, respectively. The gateway machines 165-169 are host machines similar to the host machines 170-174 in some embodiments (e.g., x86 boxes), but host SRs rather than user VMs. In some embodiments, MFEs 175 also operate on the gateway machines 165-169, to handle logical switching as well as routing for the DR 178. For instance, packets sent from the external network 140 may be routed by the SR routing table on one of the gateway machines and then subsequently switched and routed (according to the DR routing table) by the MFE on the same gateway. The dashed-line rectangle that represents the DR indicates that this routing component of the logical router is implemented by all of the MFEs 175 in the host and gateway machines.

In addition, the MFE provides the connections to the physical NICs on the gateway machines 165-169. Each of the MFEs 175 in the gateway machines 165-169 connects to one of the external routers 150-155, as well as to the other MFEs that implement the logical network in the datacenter (e.g., through tunnels). As described above, the SRs may be implemented as a namespace, a virtual machine, or as a virtual routing and forwarding (VRF) element in different embodiments. While some embodiments allow two SRs operating in active-standby mode (e.g., when the SRs provide stateful services such as firewalls), the examples described herein operate in active-active mode (enabling ECMP routing for both ingress and egress traffic).

In some embodiments, when an MFE executing in one of the host machines 170-174 receives a packet from a VM that is coupled to the MFE, it performs the processing for the logical switch to which that VM is logically coupled, as well as the processing for any additional logical forwarding elements (e.g., processing for logical router 105 if the packet is sent to the external network 140, logical router processing and processing for the other logical switch if the packet is sent to VM coupled to the other logical switch, etc.). The management and control system of some embodiments distributes the logical forwarding data of the LFEs (i.e., the logical L2 switches 110 and 120, and the logical L3 router 105) to the MFEs 175 in order for the MFEs to implement these logical forwarding elements.

In some embodiments, local network controllers (not shown) operate on each of the gateway and host machines, for the purpose of receiving configuration data from the management and control system (e.g., as a set of formatted data tuples). The received configuration data might be general configuration data that is defined for all of the MFEs or a particular subset of MFEs. The local controller then converts and customizes the received data for the local MFE that operates on the same host machine on which the local controller operates. The local controller then delivers the converted and customized data to the local MFE on each host machine.

For instance, the configuration data may specify the location (e.g., IP address) of each MFE as a tunnel endpoint (i.e., a software VTEP or a hardware VTEP in case of a TOR switch). The different MFEs receive the tunnel endpoint addresses of the other MFEs that implement the logical forwarding elements from the CCP cluster and store these addresses in the MFEs' corresponding VTEP tables. The MFEs then use these VTEP tables to establish tunnels (shown as double arrow lines between the MFEs) between each other. For example, in an east-west network communication, a source VTEP uses its corresponding VTEP table data to encapsulate the packets received form a source VM. The source VTEP encapsulates the packets using a particular tunnel protocol (e.g., VXLAN protocol), and forwards the packets towards the destination VTEP. The destination VTEP then decapsulates the packets using the same particular tunnel protocol and forwards the packets towards a destination VM.

In addition to configuring the MFEs to handle the east-west traffic, the management and control system generates and distributes configuration data to the gateway machines of an edge cluster (not shown) including the gateway machines 165-169 to connect the virtual machines VM1-VM6 to the external network 140 (and to provide stateful services to these VMs). Part of such configuration data can be neighboring dynamic routing protocol configuration data for configuring the SRs of the gateway machines to establish dynamic routing protocol sessions (e.g., BGP sessions) with their neighboring routers and to exchange routing data with their neighbors under those protocols.

FIG. 1C illustrates the selective distribution of BGP neighbor configuration (generated by the management and control system) to the different gateway machines 165-169. Specifically, this figure shows how the management and control system 160 selectively distributes the peering configuration to each gateway machine that implements one of the SRs in order for the SR to peer with its neighboring router. The dashed lines between the management and control system and the gateway machines represent management and control channels carrying the management and control data.

This figure includes the same gateway machines, external routers, and external network shown in FIG. 1B. In addition, the figure shows the management and control system and distribution of the BGP configurations. The figure also shows that SR 134 is coupled to the external router 150, while the SRs 136 and 138 are coupled to the external router 155. These two external routers, in turn, are connected to the external network 140 (e.g., through other forwarding elements that are not shown).

As described above, a user defines that logical router (including the uplinks of the router), the neighboring routers for the logical router, and potential dynamic routing protocols for the uplinks of the logical router. For example, the user defines the logical router to have a first uplink port that has an IP address of 1.1.3.1, a second uplink port that has an IP address of 1.1.4.1, a third uplink port that has an IP address of 1.1.4.11. The user also defines that these uplink ports should be connected to the external network 140 through a first physical router that has an interface with an IP address of 1.1.3.2, and a second physical router that has an interface with an IP address of 1.1.4.2.

The management and control system 160 receives these definitions and configures the gateway machines to implement the corresponding SRs for the uplinks such that the subnets of each SR is the same as the subnet of its corresponding physical router. As such, SR 134 is configured on gateway 165 to be coupled to the router 150, while SRs 136 and 138 are configured on gateway machines 167 and 169, respectively, to be coupled to the external router 155.

The management and control plane also generates BGP neighbor configuration data based on the received definitions of BGP neighbors. The generated configuration data is for configuring each SR to communicate routing data with its corresponding neighbor router. However, the management and control system 160 does not distribute the configuration data to every gateway machine that implements an SR. Instead, based on the received definition, the management and control system 160 determines that the BGP configuration data 180 for configuring an SR to communicate with the router 150 has to be only delivered to gateway 165 that executes SR 134.

In some embodiments, the management and control system makes such a determination by identifying the subnet of the external router (e.g., from the IP address received from the user) and delivering the configuration to the SR that shares the same subnet with the external router (i.e., to the machine that runs such an SR). Similarly, as shown, the management and control system 160 delivers the BG neighbor configuration data 185 for the external router 155 to the gateway machines 167 and 169 since these two machines operate the SRs 136 and 138 which share the same subnet as the physical router 155.

Even though in the above-described example, the method dynamically configures the centralized routing components (e.g., based on their neighboring routers' information), in some embodiments an administrator can override such a dynamic configuration. For example, in some embodiments, the administrator has the option to explicitly specify which uplink ports of a logical router should be configured to peer with a particular neighbor for a particular protocol. That is, the user can directly provide (e.g., as part of a BGP neighbor's definition) which uplink port(s) of the logical router should be peered with a particular BGP neighbor.

Upon receiving an overriding specification from the user, some embodiments deliver the BGP neighbor configuration only to the centralized routing component(s) that implements the specified uplink port(s) and no other SR, that would have received the configuration had it not been overridden by the user, receives the configuration. In the example illustrated in FIG. 1C, it is shown that a BGP neighbor (i.e., router 155) is reachable through two different routing components of the logical router (i.e., SR 136 and SR 138) and as such the corresponding gateway machines will receive the BGP configuration data for the BGP neighbor.

However, if a user wants that only one of the uplinks establishes a BGP session with the BGP neighbor, the user can identify the particular uplink when the user defines the BGP neighbor. For example, the user can specify in the definition of the BGP neighbor 155 that it should be peered only with SR 136 running on the gateway machine 167. Under such circumstances, the management and control plane delivers the BGP configuration data 185 only to this gateway machine 167 instead of delivering this configuration to both of the gateway machines 167 and 169.

It should be noted that, while in these examples each uplink is assigned to a separate SR, in some embodiments multiple uplinks may be assigned to (and implemented by)

the same SR. In such cases, an SR with multiple uplinks will be configured to peer with any physical routers reachable for any of its uplinks.

In the above and below examples, the management and control system is described as to be a unified entity that generates and distributes the BGP neighbor configuration data. However, in some embodiments a manager of the network receives the definitions from a user (e.g., through API calls or a graphical user interface) and generates the necessary BGP configuration data. The manager then pushes the generated configuration to one or more controllers of the network. The controllers are the entities that configure the gateway machines to implement the SRs. In some embodiments, the manager selectively distributes the BGP neighbor configurations to the local controllers of the gateway machines, while in other embodiments a master controller that is in charge of the gateway machines distributes the different configurations to the different machines.

It is important to note that the peering methods described above and below is not limited to dynamic routing protocols' configuration or in particular to BGP neighbor configuration (e.g., both external BGP and internal BGP). That is the management and configuration system of some embodiments peers the SRs with their neighboring external routers based on other network protocols in a similar manner described above and below for BGP neighbors. For example, upon receiving a definition of a Bidirectional Forwarding Detection (BFD) protocol defined for a particular uplink of a logical router to be established with a neighboring router, the management and control system of some embodiments generates and distributes the necessary BED configuration data for the particular uplink only to the routing component that is associated with that uplink.

Additionally, in the example shown in FIGS. 1A-1C, the logical router that connects to the external network also connects directly to the logical switches. In some embodiments, two (or more) tiers of logical routers are defined within a logical network. A first tier logical router is a provider logical router (PLR), which provides a connection between the logical network implemented in a datacenter and the external network. A PLR is often administered by the owner of the hosting system (e.g., the network administrator of a datacenter). A second tier logical router is a multiple tenant logical router (TLR), which may connect to the southbound interfaces of a PLR, allowing different tenants of a datacenter to configure their own logical routers (and logical switches).

In the two-tiered case of some embodiments, the PLRs implement BGP (or other routing protocols) in the manner described herein, in order to exchange routes with the external network. In some such cases, the logical switches that connect to the TLRs may be public subnets, and the PLR advertises routes for these logical switch subnets. The two tiers of logical routers are described in further detail in U.S. Provisional Application 62/110,061 and U.S. Patent Publication 2016/0226754, which are incorporated by reference above.

Figure 2:
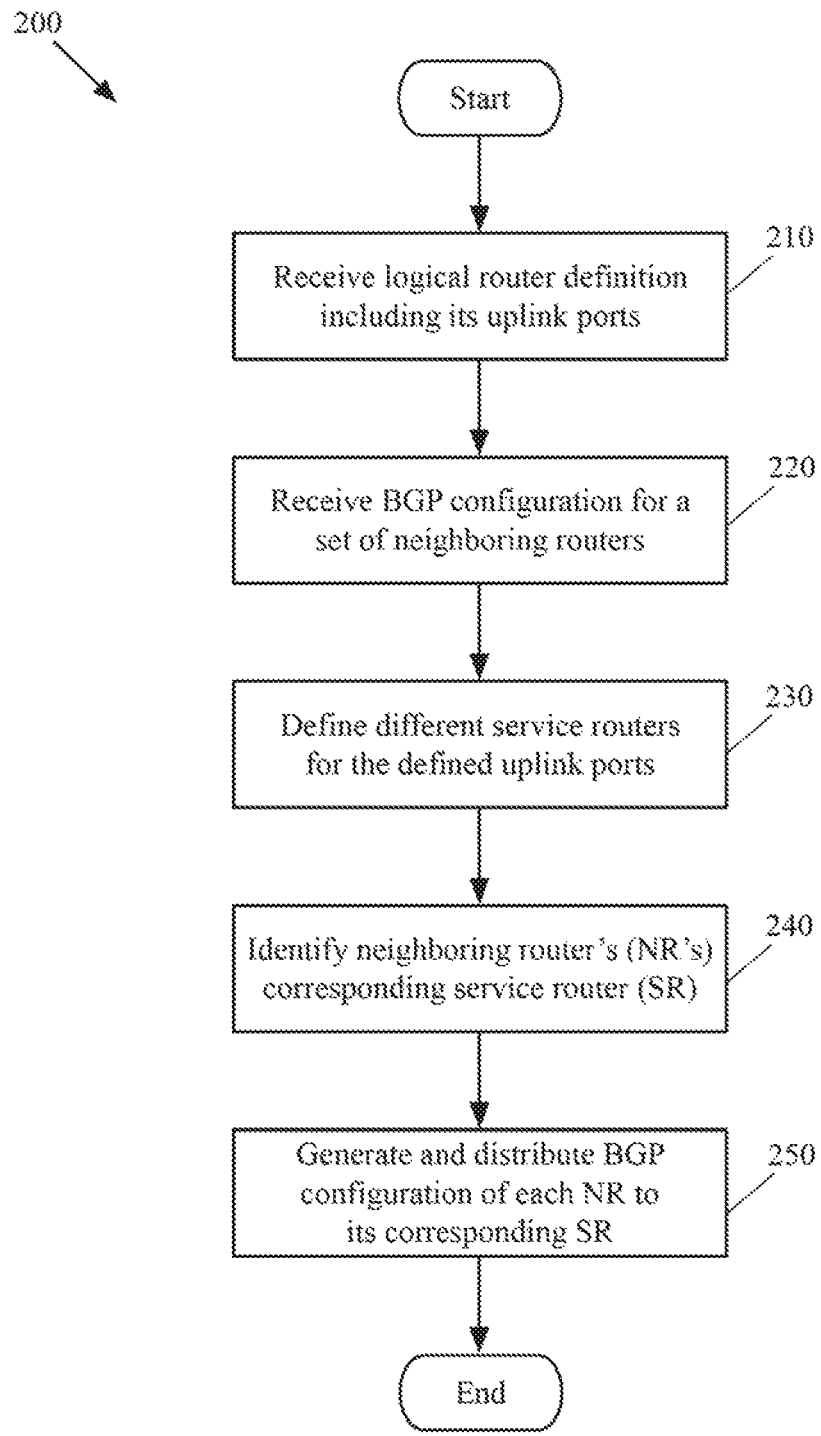
FIG. 2 conceptually illustrates a process of some embodiments for configuring different host machines to implement different centralized routing components that implement the uplinks of a logical router.

FIG. 2 conceptually illustrates a process 200 of some embodiments for configuring different host machines to implement different centralized routing components that implement the uplinks of a logical router. The process 200 is performed by the management and control system of a network in some embodiments. For instance, in some embodiments, this process is performed by a manager machine in a set of manager and controller machines that implements the management and control planes of a hosting system. In some other embodiments, a controller in the management and control system performs this process.

The process is initiated by receiving (at 210) the definition of a logical router from a user. As described above, a user defines a logical network by defining the different logical network entities of the logical network (e.g., a logical network of a tenant of a datacenter). Among these entities can be a logical router that connects the logical network to one or more external networks. As part of the definition of such a logical router, the user defines the southbound and northbound interfaces of the logical router and their respective connections to the other entities. For a logical router that connects to an external network, the northbound interfaces (uplinks) of the logical router typically couple to other forwarding elements through which the external network is reachable.

The process also receives (at 220) the definition of a set of routing protocol (e.g. BGP) neighboring routers (that connect the logical router to the external networks). The received definition of BGP neighbors includes, but is not limited to, the IP addresses of the neighbors, autonomous system (AS) numbers, administrative distances, etc. From the received definitions, the process can identify the subnets that are shared between each service router associated with an uplink of the logical router and the service router's BGP neighbor.

The process then defines (at 230) different service routers for the different uplinks of the logical router. That is, the process generates configuration data for configuring the edge machines to implement the required service routers for the uplinks of the logical router. After configuring the service routers, the process identifies (at 240) one or more service routers for each neighboring router (e.g., BGP neighbor).

The process of some embodiments makes such an identification by looking at the IP addresses of the SRs and BGP neighbors and determining which SRs share the same subnet with a BGP neighbor. After identifying the SRs, the process of some embodiments generates (at 250) the BGP configuration data for all of the SRs and selectively distributes the BGP neighbor configuration data for each BGP neighbor only to its associated SR's machine (i.e., to the gateway machine that runs the SR). The process then ends.

The specific operations of the process 200 may not be performed in the exact order shown and described. For example, the process of some embodiments may receive the neighboring routers' information before receiving the logical router's information or receive this information simultaneously. Also, the specific operations may not be performed in one continuous series of operations, and different specific operations may be performed in different embodiments. For example, the process of some embodiments only generates the configuration data for the SRs and hands them over to another process. The other process then selectively distributes the BGP neighbor configuration data to the host machines. Additionally, one of ordinary skill in the art would realize that the process 200 could be implemented using several sub-processes, or as part of a larger macro process.

The neighboring routers with which the logical router peers may not be a single-hop neighbor (i.e., on the same external subnet as the uplink interface of the logical router). For example, some embodiments allow a user to define a BGP multi-hop neighbor for a logical router. A BGP (or other protocol) multi-hop neighbor for a logical router is a BGP peer that is more than one hop away from an uplink port of the logical router (i.e., there are one or more external routers between the BGP neighbor and the uplink port of the logical router). Upon receiving the definitions of the logical router and its multi-hop neighbor, some embodiments automatically generate the necessary multi-hop neighbor configuration for the logical router and deliver the generated configuration to the edge node(s) that implement the corresponding routing components of the logical router, as with a single-hop neighbor.

In some embodiments, for multi-hop neighbors, the management and control system generates the multi-hop neighbor configuration data and delivers the generated data to one or more controllers that manage the centralized routing components of the logical router or their edge host machines. These controllers may be local control applications that operate on the host machines (e.g., in the virtualization software of the host machines) or external controllers that manage multiple host machines in different embodiments. In some embodiments, the controllers monitor the routing data (e.g., routing tables) of their corresponding routing components in order to determine the reachability of the multi-hop neighbor.

The routing data may be received from different sources in some embodiments. For example, an administrator might configure for the logical router a static route for the subnet to which the multi-hop neighbor belongs that forwards all the traffic to that subnet through a specific uplink. In this case, the routing table for the routing component implementing that specific uplink (and the routing tables of other components) will be updated with the static route, such that the traffic for the subnet is all sent to that routing component. In addition, the controller managing the specific routing component will configure the routing component to peer with the multi-hop neighbor.

In addition, the centralized routing components may already have other routing protocol peers, with which they exchange routing information (e.g., other single hop peers), and can receive routes to the multi-hop neighbor from these peers. These routes are added to the routing table (e.g., by the controller that manages the component), and the controller monitors these routing tables for a route to the multi-hop neighbor. In some embodiments, only when a controller determines that a multi-hop neighbor (e.g., a BGP neighbor) is reachable through its corresponding routing component does the controller configure the corresponding routing component to peer with the multi-hop neighbor.

Figure 3:
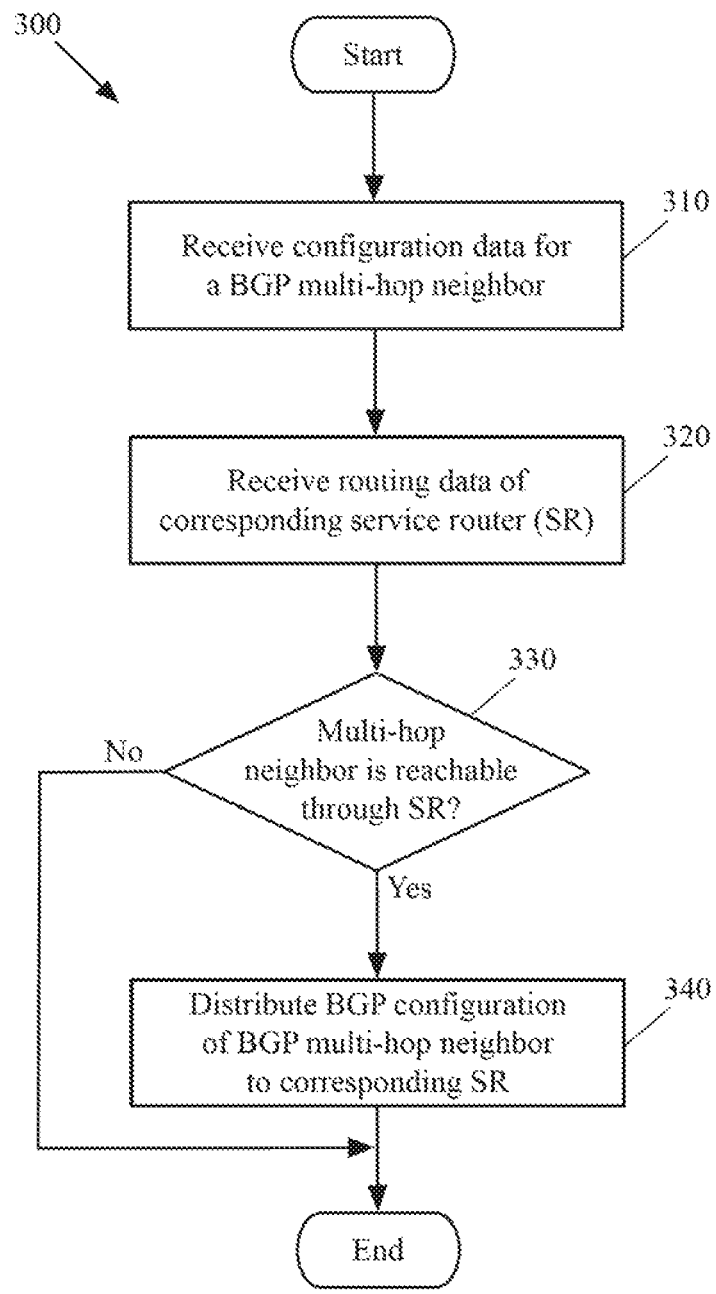
FIG. 3 conceptually illustrates a process of some embodiments for selectively distributing a multi-hop neighbor configuration data to different host machines that implement different centralized routing components.

FIG. 3 conceptually illustrates a process 300 of some embodiments for selectively distributing a multi-hop neighbor (e.g., BGP neighbor) configuration data to different host machines that implement different centralized routing components. In some embodiments, the process 300 is performed by a controller of the network that is in charge of a routing component of a logical router. Said controller is a local controller that runs on the same host machine as the routing component in some embodiments.

In some other embodiments this controller is a controller that operates on a different machine than the machine on which the routing component operates. In some such embodiments, the controller can be responsible for a set of routing components that operate on different host machines. FIG. 3 will be described by reference to FIG. 4, which illustrates, through three different stages 405-415, an example of monitoring the forwarding tables of a routing component coupled to a non-BGP neighboring router in order to configure the routing component to establish a BGP session with a multi-hop BGP neighbor.

The process 300 starts by receiving (at 310) the configuration data for a multi-hop neighbor (e.g., a BGP next-hop neighbor). As discussed above, the process may receive this configuration data from a manager in the management and control system, which, in turn, has generated the BGP neighbor configuration data by receiving the logical router and its neighboring routers' definitions from a user. The process receives this configuration irrespective of having accessibility to the BGP multi-hop neighbor for which the configuration is received.

Figure 4:
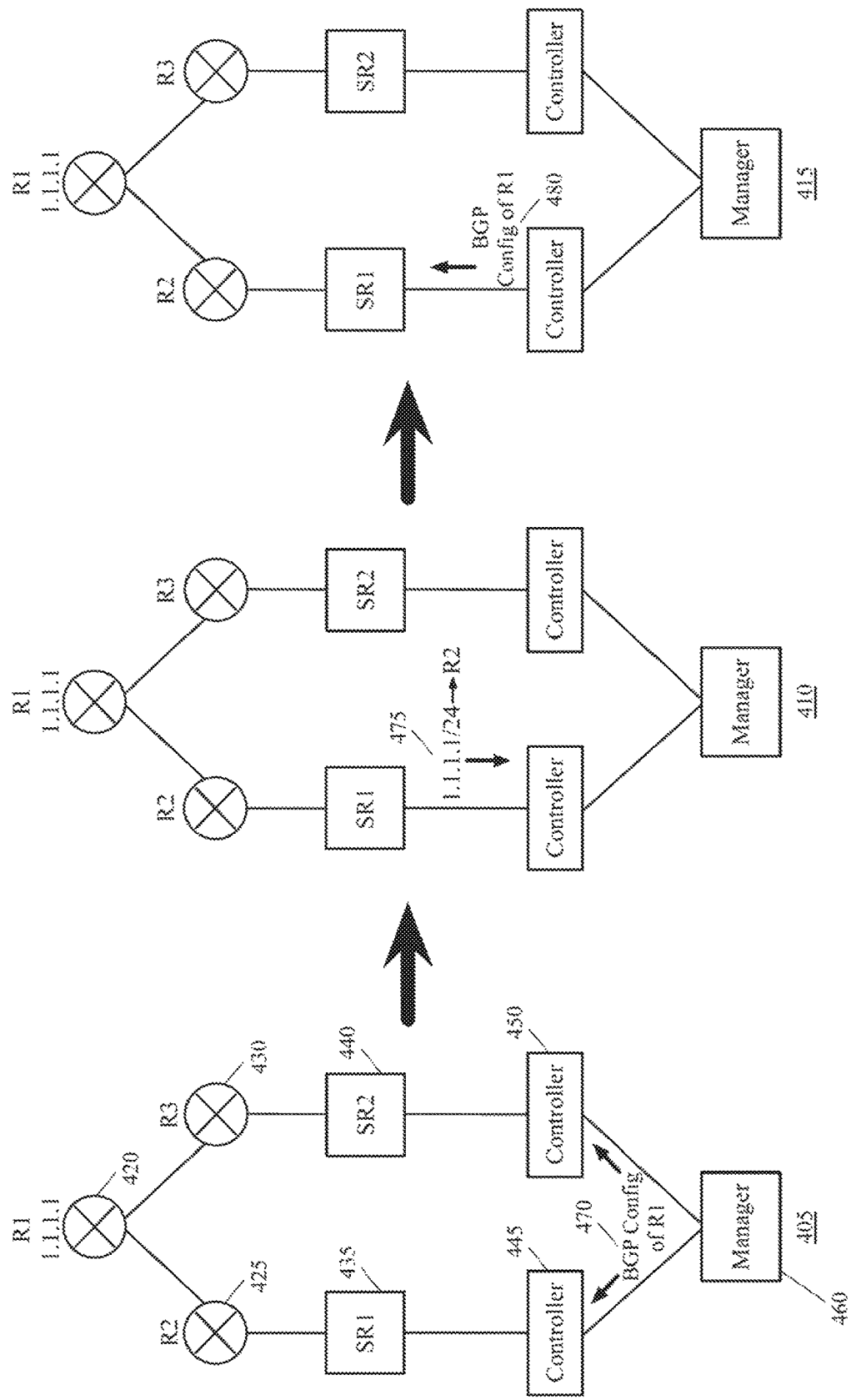
FIG. 4 illustrates an example of monitoring the forwarding tables of a routing component that is coupled to a non-BGP neighboring router in order to configure the routing component to establish a BGP session with a multi-hop BGP neighbor.

FIG. 4 includes a multi-hop BGP neighbor (a next-hop BGP neighbor in this example) 420 that is coupled to one of the centralized routing components (SR 435) associated with an uplink of particular logical router through a non-BGP first-hop router 425. The other uplink of the logical router is implemented by SR 440, which is coupled to another physical router 430. The controllers 445 and 450 are in charge of configuration of the SRs 435 and 440, respectively. These controllers receive the required configuration data from the management and control system 460.

It is important to note that even though the controllers 445 and 450 are part of the management and control system 460 as well, they are shown as separate entities because these particular controllers in the management and control system manage and monitor their corresponding SRs. As described above, each of the controllers 445 and 450 can be a local controller that runs on the same host machine as its corresponding SR, or alternatively, a controller that operates on a different machine than the machine on which the corresponding SR operates. Additionally, a single controller maybe in charge of managing and configuring both of the SRs.

The first stage 405 of FIG. 4 shows that the management and control system 460 is distributing the BGP configuration data 470 for the BGP next-hop neighbor 420 to both of the controllers 445 and 450, which are in charge of the SRs 435 and 440, respectively. As shown, the configuration data includes the related port address of the router 420 (i.e., the southbound port of the router 420 which has an IP address of 1.1.1.1). The reason for sending the configuration data to both of the controllers is that at this point, the management and control system 460 does not know which of the SRs 435 and 440 has access to the BGP next-hop neighbor 420 in order to deliver the required configuration to that SR only.

Returning to FIG. 3, after receiving the configuration data for the BGP multi-hop neighbor, the process determines (at 320) routing data for the managed SR. That is, the process receives routing data from a corresponding centralized routing component of the logical router that the process manages. As described, the process receives this data by continuously monitoring the forwarding tables of the corresponding routing component for identifying the reachability of the BGP multi-hop neighbors. In some embodiments the process periodically queries the forwarding tables of the corresponding SR, while in other embodiments each time the forwarding tables are updated, the process receives the updated data.

The process then determines (at 330) whether the multi-hop neighbor is reachable through the corresponding SR based on the data the process has received from the corresponding SR. As described above, many different sources may be the cause of an update in the forwarding tables of an SR. For example, a user may define a static route (when the user defines the logical router or at a later time) for an SR of the logical router which is indicative of the reachability of a multi-hop neighbor through the SR.

When the process determines that the multi-hop neighbor is reachable through the corresponding SR, the process configures (at 340) the managed SR to peer with the multi-hop BGP neighbor. In other words, the SR is configured to establish a BGP session with the BGP multi-hop neighbor. On the other hand, if the process determines that the multi-hop neighbor cannot be reached from the corresponding SR, the process does not distribute any BGP configuration data to the SR. The process then ends.

The second stage 410 of FIG. 4 illustrates that the SR 435 is sending forwarding data 475 to the controller 445 which indicates the subnet of the next-hop neighbor 420 (i.e., subnet 1.1.1.0/24) can be reached through the non-BGP neighboring router 425. The SR 435 sends this data to the controller 445 after, e.g., a static route is defined for the logical router that instructs the router to reach the subnet of router 420 via the router 425. When the management and configuration system receives this specification, the management and control system generates the corresponding forwarding data for the forwarding tables of the SR 435 and updates the tables with the generated data.

The third stage 415 shows that when the controller 445 receives the information 475, the controller realizes that the next-hop router 420 can be reached through its corresponding service router (i.e., SR 435). Consequently, the controller 445 sends the required configuration data 480 to the SR 435 and configures this SR such that the configured SR can set up a BGP session with its BGP next-hop neighbor 420.

The specific operations of the process 300 may not be performed in the exact order shown and described. For example, the process of some embodiments does not end when the process determines (at 330) whether the multi-hop neighbor is reachable through a corresponding service router. Instead, the process of some embodiments continuously monitors (e.g., as a recursive module) the corresponding service router's forwarding tables and asks for updated data from the service router (as described below by reference to FIG. 5). As stated above, in some other embodiments, the process is triggered each time the forwarding table of the corresponding service router is updated.

Additionally, the specific operations of the process 300 may not be performed in one continuous series of operations, and different specific operations may be performed in different embodiments. Furthermore, one of ordinary skill in the art would realize that the process 300 could be implemented using several sub-processes, or as part of a larger macro process.

Figure 5:
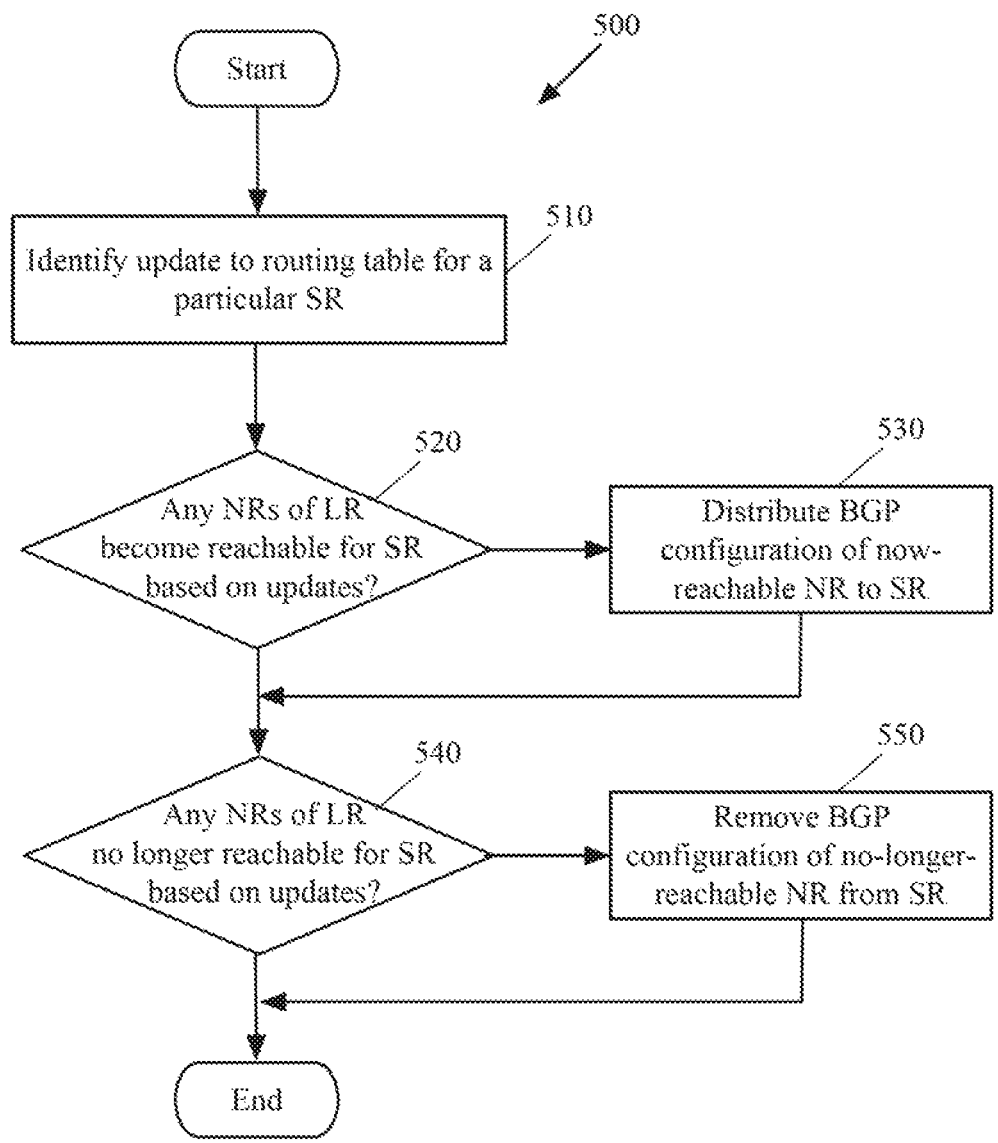
FIG. 5 conceptually illustrates a process of some embodiments for updating the dynamic routing protocol (or other protocol, such as BFD) configuration of a centralized routing component (SR) based on the routing table of the SR.

FIG. 5 conceptually illustrates a process 500 of some embodiments for updating the dynamic routing protocol (or other protocol, such as BFD) configuration of a centralized routing component (SR) based on the routing table of the SR. In some embodiments, this process is performed by a local controller operating on the same machine as the SR, which is provided the configuration for all neighbors of the logical router of which the SR is a component. The local controller provides the SR with the appropriate configurations based on the neighbors identified for the particular SR. In other embodiments, the process is performed by a central controller (or central control plane cluster) that analyzes the muting tables of multiple SRs.

As shown, the process 500 begins by identifying (at 510) an update to a routing table for a particular SR. As mentioned, when performed by a local controller, this SR is an SR managed by that local controller (i.e., operating on the same physical host as the SR). Some embodiments continuously monitor the SRs for routing table changes (in some embodiments, the local controller is also responsible for processing these routing table changes and configuring the routing table of the SR). These routing table updates may be the result of dynamic routing protocol updates from existing neighbors of the SR, or of administrator-driven configuration (e.g., new static routes).

Upon identifying that the routing table for the SR is updated, the process 500 determines (at 520) whether any of the neighboring routers of the logical router for which the SR is a component have become reachable based on the updates (i.e., and were not previously reachable for the SR). In some embodiments, reachability means that there is a route with less than a maximum administrative distance to the neighboring router. In other embodiments, any non-default route for a subnet containing the address of the neighboring router will cause the neighboring router to be considered reachable. When the routing table update causes at least one new neighboring router to become reachable for the SR, the process distributes (at 530) the BGP (or other protocol) configuration for the now-reachable neighboring router(s) to the SR. That is, the process configures the SR to peer with the neighboring router as a multi-hop BGP (or other protocol) neighbor.

In addition, the process 500 determines (at 540) whether any of the neighboring routers with which the SR currently peers are no longer reachable for the SR based on the updates. For example, if a static route is removed by an administrator and the SR no longer has a non-default route to a subnet that includes the neighboring router's address, some embodiments determine that the router is no longer reachable. In addition, a BGP update from a different neighbor of the SR might indicate that a route to a subnet including the neighboring router's address has been removed (e.g., due to a change in the external network's configuration). When the routing table update causes at least one current neighbor of the SR to no longer be reachable, the process removes (at 550) the BGP (or other protocol) configuration of that neighbor from the SR.

In some embodiments, when a user queries the state of a BGP neighbor of a logical router, the management and control system retrieves the related data from all of the centralized routing components of the logical router on which the BGP neighbor is configured. The management and control system then aggregates the retrieved data into a unified state/status report of the neighbor for the BGP neighbor and provides the unified report to the user. In some embodiments, if a BGP neighbor is not configured on any of the active centralized routing components, the manage men and control system reports the BGP neighbor as a disabled BGP neighbor.

Figure 6:
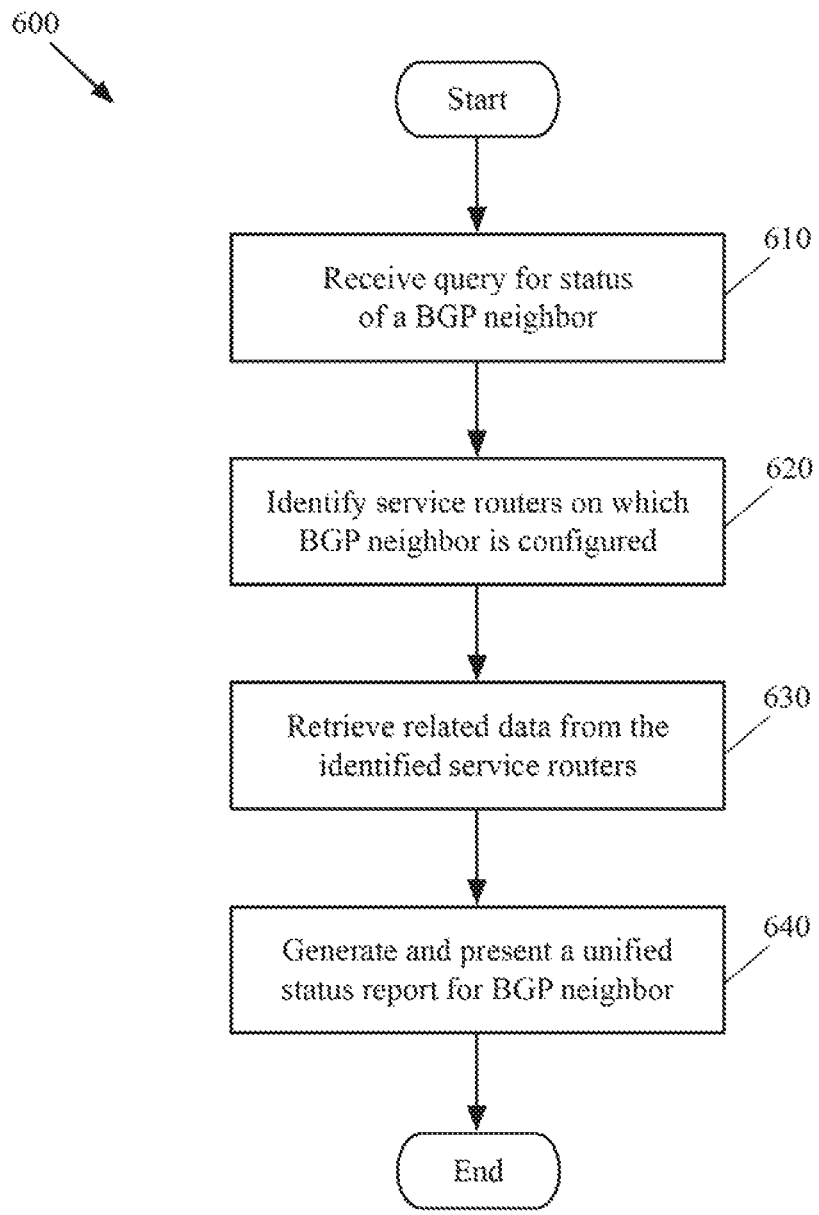
FIG. 6 conceptually illustrates a process of some embodiments that receives a query for the state of a routing protocol (e.g., BGP) neighbor and provides an aggregated report about the status of the neighbor.

FIG. 6 conceptually illustrates a process 600 of some embodiments that receives a query for the state of a routing protocol (e.g., BGP) neighbor and provides an aggregated report about the status of the neighbor. The process 600 is performed by the management and control system of a network in some embodiments. For example, a manager machine in the management and control system of the network performs the process 600 in some embodiments.

The process starts by receiving (at 610) a status report for a particular BGP neighboring router. For example, a manager machine of the network provides a graphical user interface to a user through which the user can query the state of different network entities such as a BGP neighbor. Upon receiving a query, the manager machine gathers the necessary information from the different resources of the network and provides the result of the query as a report to the requesting user.

After receiving the request, the process identifies (at 620) the different service routers on which the requested BGP neighbor is configured. That is, since the configuration data of the requested BGP neighbor is only distributed to service routers that can establish a BGP session with the BGP neighbor, only these service routers can provide the status of the requested BGP neighbor. As such, the process should communicate with the relevant service routers to receive the state of the BGP neighbor.

The process then retrieves (at 630) the related data that shows the status of the requested neighbor on each service router from the service router. After gathering all the required information, the process generates (at 640) a unified report about the status of the queried BGP neighbor and provides the generated report to the requesting user. The process then ends.

The specific operations of the process 600 may not be performed in the exact order shown and described. The specific operations may not be performed in one continuous series of operations, and different specific operations may be performed in different embodiments. Additionally, one of ordinary skill in the art would realize that the process 600 could be implemented using several sub-processes, or as part of a larger macro process.

The above-described selective distribution of neighbor configuration data to routing components is not limited to initial configuration of a logical router (i.e., when the user defines the logical router). Some embodiments reconfigure some or all of the routing components of a logical router with dynamic routing protocol configuration data when there is a change in uplink configuration of the logical router. As an example, based on an initial definition of a logical router, the management and control system may decide to deliver the BGP neighbor configuration of a logical router to a first centralized routing component of the logical router.

If a user later adds another uplink to the logical router (hence another centralized routing component to be implemented for the logical router), which peers with the same (or different) BGP neighbor, the management and control system delivers the same (or different) BGP configuration data to the newly implemented centralized routing component. In other words, each time the uplink ports of a logical router are modified (e.g., an uplink port is added, an uplink port is deleted, etc.), the management and control system determines whether a new generation and delivery of BGP neighbor configuration data is required based on the recent modification.

Figure 7:
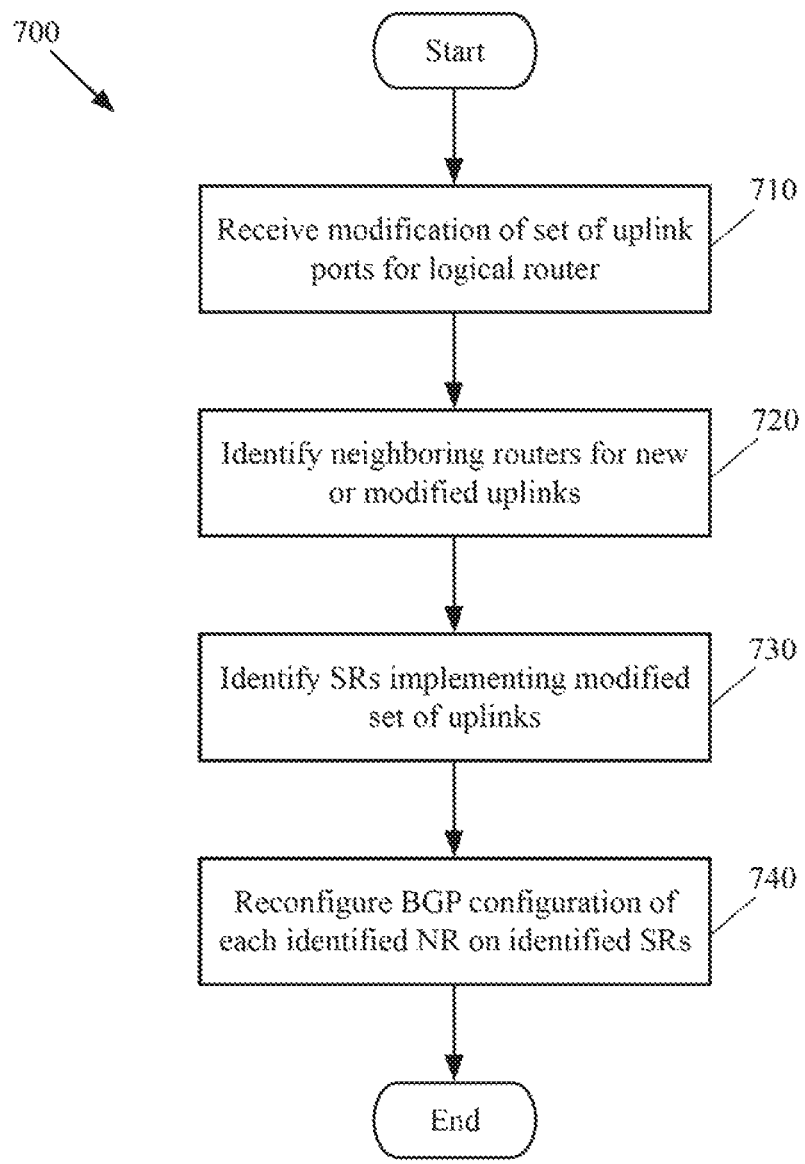
FIG. 7 conceptually illustrates a process 700 for configuring BGP neighbors upon the modification of the uplinks for a logical router.

FIG. 7 conceptually illustrates a process 700 for configuring BGP neighbors upon the modification of the uplinks for a logical router. The process 700 is performed by the management and control system of a network in some embodiments. For instance, in some embodiments, this process is performed by a manager machine in a set of manager and controller machines that implements the management and control planes. In some other embodiments, a controller in the management and control system performs this process.

As shown, the process 700 begins by receiving (at 710) a modification to the set of uplink ports for a logical router. For instance, the user might add an uplink to the logical router, delete an uplink from the logical router, or change the configuration of an uplink (e.g., change the IP address of the uplink or the subnet to which the uplink connects). In some embodiments, this change is received based on user configuration (e.g., received through a cloud management application).

The process then identifies (at 720) the neighboring routers for any new or modified uplinks. In some embodiments, the process determines these routers in the same manner as described above by reference to FIG. 2. That is, the management and control system determines the neighbors for each uplink in the same manner irrespective of whether generating an initial configuration or updating an existing logical router.

The process 700 also identifies (at 730) the SRs that implement the modified set of uplinks (i.e., the binding of each uplink to an SR). This may be a new SR created specifically for a new uplink, or an existing SR to which a new uplink has been added or on which a modified uplink is implemented.

Finally, the process reconfigures (at 740) the BGP configuration of each identified neighboring router for the identified SRs. For an existing SR, if one or more of its existing uplinks already peers with the neighbor, then no additional configuration needs to be distributed in some embodiments. However, if an existing or new SR does not already peer with the neighbor, then the configuration is distributed in order to allow the SR to initiate the peering process. If an uplink is removed from an SR that remains (e.g., with another uplink), then the configuration for a neighboring router may need to be removed from that SR as part of the reconfiguration.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
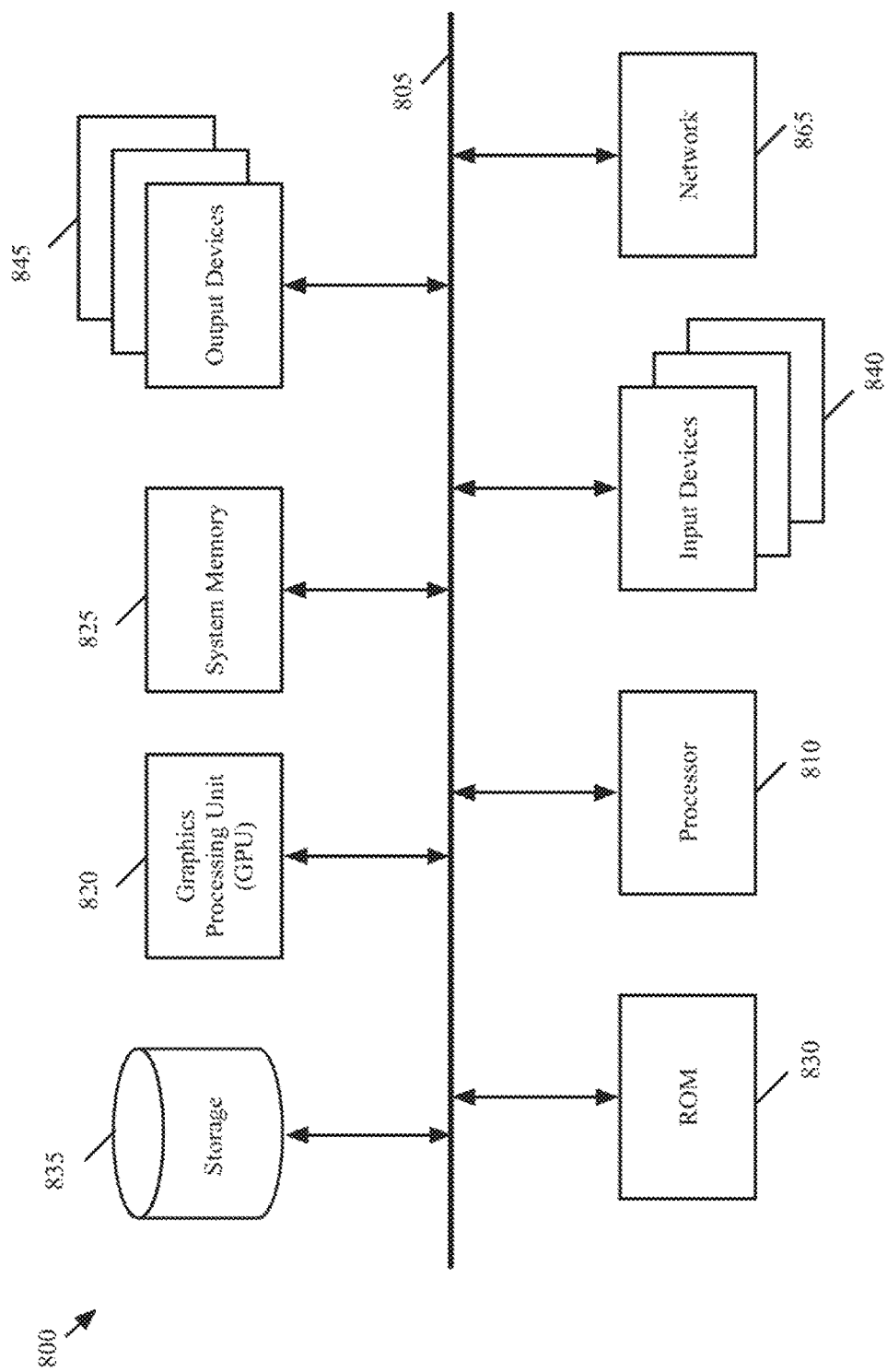
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash memory device, etc., and its corresponding drive) as the permanent storage device. Like the permanent storage device 835, the system memory 825 is a read-and-write memory device. However, unlike storage device 835, the system memory 825 is a volatile read-and-write memory, such a random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices 840 enable the user to communicate information and select commands to the electronic system. The input devices 840 include alphanumeric keyboards and pointing devices (also called "cursor control devices"), cameras (e.g., webcams), microphones or similar devices for receiving voice commands, etc. The output devices 845 display images generated by the electronic system or otherwise output data. The output devices 845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 2, 3, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method for configuring a logical router to exchange routing data with neighboring routers through a dynamic routing protocol, the logical router implemented as a plurality of routing components, the method comprising:
   receiving identification data for a first physical router and a second physical router with which to peer the logical router;
   based on the identification data, identifying (i) a first subset of the routing components to peer with the first physical router and (ii) a second subset of the routing components to peer with the second physical router, the second subset comprising at least one routing component of the logical router that is not in the first subset; and
   generating configuration data for each routing component in the first and second subsets, wherein (i) each routing component in the first subset uses the configuration data to exchange routing data with the first physical router through the dynamic routing protocol and (ii) each routing component in the second subset uses the configuration data to exchange routing data with the second physical router through the dynamic routing protocol.

2. The method of claim 1 further comprising distributing the generated configuration data for a particular routing component in one of the identified subsets for delivery to a host machine that implements the particular routing component.

3. The method of claim 2, wherein the host machine is one of a set of host machines each of which implements one of the routing components in the identified subsets.

4. The method of claim 1, wherein at least one of the routing components in the identified subsets exchanges north-south traffic for a logical network with an external network through the physical router.

5. The method of claim 1 further comprising:
   receiving a definition of the logical router;
   based on the received definition, defining the plurality of routing components; and
   configuring a plurality of host machines to implement the plurality of routing components for the logical router.

6. The method of claim 5, wherein the definition of the logical router comprises a plurality of uplink interfaces each of which connects the logical router to an external network, wherein each routing component in the identified subsets of routing components implements at least one of the uplink interfaces.

7. The method of claim 5, wherein each routing component in the identified subsets of routing components is a centralized routing component implemented as a virtual machine that executes on one of the host machines.

8. The method of claim 5, wherein each routing component in the identified subsets of routing components is a centralized routing component implemented in a managed forwarding element datapath of one of the host machines.

9. The method of claim 1, wherein each routing component in the identified subsets of routing components is a centralized routing component, wherein the plurality of routing components further comprises a distributed routing component and at least one additional centralized routing component that is not in either the first or second sub sets.

10. The method of claim 1, wherein the dynamic routing protocol is Border Gateway Protocol (BGP), wherein the first and second physical routers is are BGP neighbors of the logical router.

11. The method of claim 1, wherein the identification data for the first and second physical routers comprises Internet Protocol (IP) addresses of interfaces of the first and second physical routers, wherein the routing components in the first subset connect to an IP subnet that includes the first physical router's IP address while the routing components in the second subset connect to an IP subnet that includes the second physical router's IP address.

12. A non-transitory machine readable medium storing a program which when executed by at least one processing unit configures a set of host machines that implements a logical router to exchange routing data with neighboring routers through a dynamic routing protocol, the logical router implemented as a plurality of routing components, the program comprising sets of instructions for:
   receiving identification data for a first physical router and a second physical router with which to peer the logical router;
   based on the identification data, identifying (i) a first subset of the routing components to peer with the first physical router and (ii) a second subset of the routing components to peer with the second physical router, the second subset comprising at least one routing component of the logical router that is not in the first subset; and
   generating configuration data for each routing component in the first and second subsets, wherein (i) each routing component in the first subset uses the configuration data to exchange routing data with the first physical router through the dynamic routing protocol and (ii) each routing component in the second subset uses the configuration data to exchange routing data with the second physical router through the dynamic routing protocol.

13. The non-transitory machine readable medium of claim 12, wherein the program further comprises a set of instructions for distributing the generated configuration data for a particular routing component in one of the identified subsets for delivery to a host machine that implements the particular routing component.

14. The non-transitory machine readable medium of claim 13, wherein the set of instructions for distributing the generation configuration data for the particular routing component comprises a set of instructions for providing the generated configuration data to a controller operating on the host machine.

15. The non-transitory machine readable medium of claim 12, wherein the first subset of routing components comprises at least one centralized routing component that is on a same subnet as the first physical router.

16. A non-transitory machine readable medium storing a program which when executed by at least one processing unit configures a set of host machines that implements a logical router to exchange routing data with a neighboring router through a dynamic routing protocol, the logical router implemented as a plurality of routing components, the program comprising sets of instructions for:
   receiving identification data for the neighboring router with which to peer the logical router, wherein the neighboring router is more than one hop away from the logical router;
   identifying routing data for the plurality of routing components;
   based on the identification data and the routing data, identifying a subset routing components to peer with the neighboring router; and
   generating configuration data for each routing component in the identified subset, wherein each identified routing component uses the configuration data to exchange routing data with the neighboring router through the dynamic routing protocol.

17. The non-transitory machine readable medium of claim 16, wherein the routing data for each particular routing component indicates whether the neighboring router is reachable through the particular routing component.

18. The non-transitory machine readable medium of claim 16, wherein the set of instructions for identifying the routing data comprises a set of instructions for generating the routing data for the routing components based on static routes received as configuration data for the logical router.

19. The non-transitory machine readable medium of claim 16, wherein the set of instructions for identifying the routing data comprises a set of instructions for receiving the routing data from the plurality of routing components based on the plurality of routing components exchanging routing data with one or more additional neighboring routers.

20. A method for configuring a logical router to exchange routing data with a neighboring router through a dynamic routing protocol, the logical router implemented as a plurality of routing components, the method comprising:
   receiving identification data for the neighboring router with which to peer the logical router, wherein the neighboring router is more than one hop away from the logical router;
   identifying routing data for the plurality of routing components;
   based on the identification data and the routing data, identifying a subset of the routing components to peer with the neighboring router; and
   generating configuration data for each routing component in the identified subset, wherein each identified routing component uses the configuration data to exchange routing data with the neighboring router through the dynamic routing protocol.

21. The method of claim 20, wherein the routing data for each particular routing component indicates whether the neighboring router is reachable through the particular routing component.

22. The method of claim 20, wherein identifying the routing data comprises generating the routing data for the routing components based on static routes received as configuration data for the logical router.

23. The method of claim 20, wherein identifying the routing data comprises receiving the routing data from the plurality of routing components based on the plurality of routing components exchanging routing data with one or more additional neighboring routers.

* * * * *